3,359,166
METHOD OF EFFECTING ANALGESIA
David A. McClure, Canoga Park, Calif., assignor to Rexall Drug and Chemical Company, Los Angeles, Calif., a corporation of Delaware
No Drawing. Filed May 5, 1967, Ser. No. 636,278
3 Claims. (Cl. 167—65)

ABSTRACT OF THE DISCLOSURE

This invention is directed to a method of effecting analgesia in mammals which comprises the administration, to a mammal suffering from pain, of a non-toxic amount of the magnesium salt of 4-thiazolidinecarboxylic acid sufficient to induce a state of analgesia therein.

---

This invention relates to a method of effecting analgesia in mammals suffering from pain.

The invention sought to be patented resides in the concept of a method for effecting analgesia in a mammal suffering from pain which comprises the administration to said mammal of a non-toxic amount of the magnesium salt of 4-thiazolidinecarboxylic acid sufficient to induce a state of analgesia in the mammal.

The manner and process of making and using the invention will now be generally described so as to enable one skilled in the art to make and use the same as follows:

In accordance with the method of this invention the magnesium salt of 4-thiazolidinecarboxylic acid is administered to a mammal suffering from pain in a non-toxic amount sufficient to induce a state of analgesia. In carrying out the method, the active ingredient is normally combined with conventional pharmaceutical diluents and carriers which are selected based upon the desired route of administration. The oral route is preferred due to ease of administration and subject acceptance. In carrying out the method, the active ingredient can, if desired, be combined with other pharmacologically active compositions customarily included in analgesic formulations.

The individual unit dosage and frequency of administration are determined not only by the nature and severity of the pain from which the mammal suffers, but in addition upon age, weight, and species of mammal its underlying physical condition and route of administration. It will accordingly be within the judgement of the practitioner administering the drug to determine the exact amount to be administered so as to be non-toxic, yet pharmaceutically effective in inducing a state of analgesia.

The best mode contemplated by the inventor for carrying out this invention will now be set forth as follows:

The 4-thiazolidinecarboxylic acid, the magnesium salt of which is used in the practice of this invention, is a known compound that is readily prepared as described by S. Ratner and H. T. Clarke, J. Am. Chem. Soc. 59:200–206 (1937), who reacted cysteine hydrochloride with formaldehyde. The magnesium salt is then prepared by conventional methods in the art of chemistry for preparing magnesium salts of organic acids.

EXAMPLE

Acute toxicity determinations, in accordance with standard pharmacological test procedures, reveal that the magnesium salt of 4-thiazolidinecarboxylic acid has an $LD_{50}$ in the mouse of 320 mg./kg. when administered intraperitoneally and 420 m./kg. when administered orally.

The analgesic activity of the magnesium salt of 4-thiazolidinecarboxylic acid was determined in accordance with a test which is a modification of the method described by Grewal (Brit. J. Pharmacol. & Chemotherap. 7:433 (1952)). Male white mice (Swiss strain CF–1), weighing between 18 and 22 grams, are randomly selected and housed, 10 mice to a cage. A Grass stimulator, adjusted to deliver one shock per second (square wave) for a duration of 0.1 sec. at 22.5 volts is used to stimulate the tail of the mouse. The base of the mouse's tail is prepared for stimulation by first cleansing with ether and then applying an electrode paste. The electrodes are then placed upon the tail and the number of shocks required to produce vocalization (squeak) is recorded. Each mouse acts as its own control during two control stimulating periods carried out 15 minutes apart. Only those mice which vocalize after receiving between 2 and 5 electrical shocks are selected for the test. A period of 30 minutes is allowed to elapse between the last control stimulation and administration of the drug. The animals are stimulated at intervals of 15, 30, 90, 120, 150 and 180 minutes after drug administration. Analgesia is judged to have occurred when the number of stimuli (electric shocks) exceeds the control number of stimuli by more than 2. An E value is obtained by counting the number of stimuli that are significant, the third stimulus after the control number being the first significant number. If the number of stimuli applied after the application of the control number of stimuli plus 2 reaches 10 without evoking a response, stimulation is discontinued. Thus, the maximum possible E value is 10. A "total analgesia" (TA) value is obtained by multiplying the sum of the E values for each mouse by the number of mice protected (that is, the number of mice showing an E value of at least 1). With the test group of 10 mice, a maximum score would be the summation of 10 E values of 10 (100) multiplied by 10 (the number of mice protected) or a total of 1000.

The test drug is administered in aqueous solution if water-soluble and when not water-soluble, as an aqueous suspension with gum tragacanth.

When the drug is administered intraperitoneally (i.p.) the animal is permitted food ad libitum both before and during the test period. When the drug is to be administered orally, the animals are fasted from 6 to 12 hours to insure emptying of the gastrointestinal tract.

The results of the evaluation of the magnesium salt of 4-thiazolidinecarboxylic acid by this procedure are tabulated below:

| Route of Administration | Dose, mg./kg. | Percent of Animals Showing Effect | Total Analgesia (TA), Time in Minutes | | |
|---|---|---|---|---|---|
| | | | 15 | 30 | 60 |
| I.p. | 50 | 30 | 36 | 0 | 0 |
| | 75 | 70 | 154 | 1 | 0 |
| | 100 | 70 | 192 | 9 | 0 |
| | 135 | 100 | 900 | 264 | 6 |
| P.o. | 50 | 60 | 204 | 1 | 0 |
| | 75 | 70 | 217 | 0 | 0 |
| | 100 | 80 | 432 | 24 | 0 |
| | 135 | 100 | 1,000 | 756 | 90 |

These data establish the effectiveness of the magnesium salt of 4-thiazolidinecarboxylic acid in inducing a state of analgesia in animals at non-toxic doses in accordance with the method of the invention sought to be patented.

That the foregoing test procedure is a valid means of determining the activity of a potent analgesic agent is established by the fact that it shows morphine sulfate to be active. For example, a test of morphine sulfate at a dose of 10 mg./kg. i.p. shows a TA value of 266 at 15 minutes and 130 at 30 minutes.

The subject matter which the applicant regards as his invention is particularly pointed out and distinctly claimed as follows:

I claim:

1. A method of effecting analgesia in mammals which comprises the administration to a mammal suffering from pain of a non-toxic amount of the magnesium salt of 4-thiazolidinecarboxylic acid sufficient to induce a state of analgesia in said mammal.

2. A method according to claim 1 wherein the route of administration is oral.

3. A method according to claim 1 wherein the route of administration is parenteral.

References Cited

H. T. Clarke, J. Am. Chem. Soc. 59 (1937).

ALBERT T. MEYERS, *Primary Examiner.*

S. FRIEDMAN, *Assistant Examiner.*